Patented Mar. 20, 1951

2,545,633

UNITED STATES PATENT OFFICE 2,545,633

PREPARATION OF LITHIUM BOROHYDRIDE

Hermann I. Schlesinger, Chicago, Ill., and Herbert C. Brown, Detroit, Mich., assignors to the United States of America as represented by the United States Atomic Energy Commission No Drawing. Application October 16, 1945, Serial No. 622,686

7 Claims. (Cl. 23—14)

This invention relates to the preparation of lithium borohydride.

It is an object of the invention to provide lithium borohydride, LiBH$_4$. It is a further object of the invention to provide a convenient and efficient method of preparing lithium borohydride. Further objects and advantages will appear from the following description.

In accordance with the present invention, it has been found that lithium borohydride may be obtained from the reaction of lithium hydride, LiH, with diborane, B$_2$H$_6$. The reaction between the lithium hydride and the diborane probably proceeds according to the following equation:

$$2LiH + B_2H_6 \rightarrow 2LiBH_4$$

It has also been found that the presence of a solvent for lithium borohydride such as, for example, diethyl ether facilitates the reaction. Other ethers such as methyl ether, n-propyl ether, n-butyl ether, dioxane or methyl Cellosolve also may be used as well as other solvents capable of coordinating with diborane or borine (BH$_3$).

In forming the lithium borohydride by the reaction of lithium hydride and diborane, the lithium hydride is suspended in ether, placed in an appropriate reaction vessel and diborane is introduced into the reaction vessel and into contact with the lithium hydride generally at or about room temperature and the desired reaction takes place. The reaction readily proceeds with evolution of heat at temperatures of 0 to 50° C.

In accordance with one manner of preparation of the lithium borohydride, the lithium hydride and the diborane are reacted in a suitably closed apparatus. The apparatus may comprise, in essence, a closed reactor equipped with an agitator and provided with adequate evacuation and distillation equipment. The reactor is also provided with conventional means for supplying the reactants and inert gas thereto.

Preparatory to carrying out the reaction, a quantity of lithium hydride is placed in the reactor. The lithium hydride is preferably in a finely divided form such as, for example, that having a particle size of from 100 mesh to 200 mesh; generally, the more finely divided is the lithium hydride, the more readily the reaction proceeds.

As previously stated the reaction is carried out using a lithium hydride-ether mixture and accordingly an ether in anhydrous state is introduced usually after the lithium hydride has been added. While the function of the ether in the process is not completely known, the ether, in liquid form, serves as a solvent for the lithium borohydride and thereby facilitates the reaction by ensuring constant exposure of new lithium hydride surface when gaseous diborane is passed over the solid lithium hydride. The ether may also form an addition produced with diborane or borine (BH$_3$) thus increasing the reactivity of the boron compound. In any case, it has been found that the reaction proceeds unusually rapidly and efficiently in the presence of sufficient ether to cover the lithium hydride in the reactor. Other ethers, either simple or mixed, which are liquid at room temperature may be used for this purpose. An amount of the ether sufficient to permit effective stirring of the reaction mixture is used.

Air is removed substantially completely from the reactor and diborane is then pumped or drawn into the reactor by convenient methods. The reaction proceeds to form the lithium borohydride. During the reaction the corresponding etherate of lithium borohydride frequently crystallizes out of solution. It may be redissolved by warming the ether solution.

The following example is illustrative.

Example I

One gram of lithium hydride was placed in a tubular reactor having a narrow, elongated neck extending upwardly from the tube and terminating in a valved inlet. The reactor was evacuated to substantially completely remove air. The lithium hydride, having a particle size of approximately 200 mesh, was introduced into the reactor through the tubular neck. 50 cc. of anhydrous diethyl ether was added through the neck of the reactor. One liter of gaseous diborane (at standard conditions) was condensed in a gas bulb by means of liquid nitrogen, and the gas bulb was securely closed and connected to the reactor. The gas bulb containing the diborane was then opened to the reactor and the diborane forced into the reactor by warming the gas bulb. As the temperature of the gas bulb was permitted to rise to approximately that of room temperature, the temperature of the reactor was substantially lowered by means of liquid nitrogen, such cooling accelerating the passage of the diborane from the gas bulb to the reactor. After the introduction of diborane was completed the reactor was sealed off and cooling of the reactor was discontinued. The temperature of the reactor was allowed to rise whereupon the reaction was initiated and was complete after about three hours standing at room temperature.

The lithium borohydride resulting from the reaction was isolated by heating the reactor to a temperature of from 34° C. to 40° C., in the absence of air, to dissolve crystallized etherate of lithium borohydride which is formed during the reaction. The solution containing lithium borohydride and/or its etherate was then filtered through a porous glass disk to remove unreacted lithium hydride. The clear solution of lithium borohydride was then evaporated to remove the diethyl ether. The distillation was carried out in vacuum, the temperature being slowly raised from room temperature to approximately 100° C. The lithium borohydride remained in the distillation flask as a solid cake. A yield of lithium borohydride of approximately 90% of the theoretical yield was obtained.

*Example II*

10 grams of LiH was placed in a reaction vessel provided with an agitator and 400 cc. of anhydrous ethyl ether distilled in. The ether suspension of LiH was stirred for a few minutes to allow any remaining water to react. An ice bath was then placed around the reaction vessel and the air pumped out of the vessel. 13 liters of diborane in gaseous state (standard temperature and pressure conditions) was condensed to liquid in a receiver by cooling to about minus 190° C. and the receiver was then connected to the reactor through a line having a stopcock. Thereupon the receiver which had been cooled to effect condensation of diborane was allowed to warm up until a pressure of 700 mm. was developed in the receiver. The stopcock connecting the receiver with the reaction vessel was opened and temperature of the receiver maintained such that the rate of evaporation of $B_2H_6$ just equalled its rate of adsorption in the reaction vessel and the diborane pressure in the reaction vessel remained at 700 mm. After about nine liters of diborane had been absorbed, a heavy slurry of $LiBH_4$ resulted, trapping some LiH. The reaction vessel, therefore, was warmed up to 15 to 20° C. at which point the $LiBH_4$ redissolved. The absorption was continued until no more liquid phase was present in the receiver. Next, the receiver was again cooled to about minus 195° C. in order to condense a quantity of ether in the receiver together with residual diborane. This condensate was revolatilized by heating to about 35–40° C. The condensed ether served to drive over the last traces of $B_2H_6$.

The reaction vessel was removed from the line and its contents transferred to an extraction apparatus comprising a pair of connected flasks with a sintered glass filter connected between the flasks. The ether suspension and solution of $LiBH_4$ was warmed to 30° C., and forced by dry $N_2$ from the first flask through the sintered glass filter into the second flask. Thereafter a partial vacuum was applied to the first flask and the ether distilled back into it through the filter. The residue was extracted by forcing the distilled ether forced into the second flask through the filter as before. After three such extractions, all the ether in the filtrate was distilled off, first by heating to 100° C. and then by degassing in high vacuum leaving white crystalline $LiBH_4$ behind. The yield of this product was 25 grams.

The above detailed description is for purposes of illustration. Details of specific embodiments thereof are not intended to limit the scope of the invention except insofar as included in the following claims.

What is claimed is:

1. A process of preparing lithium borohydride which comprises reacting diborane and lithium hydride.

2. A process of preparing lithium borohydride which comprises reacting diborane and lithium hydride in the presence of an ether.

3. A process of preparing lithium borohydride which comprises reacting diborane and lithium hydride in the presence of diethyl ether.

4. A process of preparing lithium borohydride which comprises reacting diborane and lithium hydride in the presence of dimethyl ether.

5. A process of preparing lithium borohydride which comprises reacting diborane and lithium hydride in the presence of dipropyl ether.

6. The method of producing lithium borohydride which comprises reacting lithium hydride with diborane out of contact with air.

7. The method of producing lithium borohydride which comprises reacting lithium hydride with diborane in the presence of an ether and out of contact with air.

HERMANN I. SCHLESINGER.
HERBERT C. BROWN.

No references cited.